Figure 1:
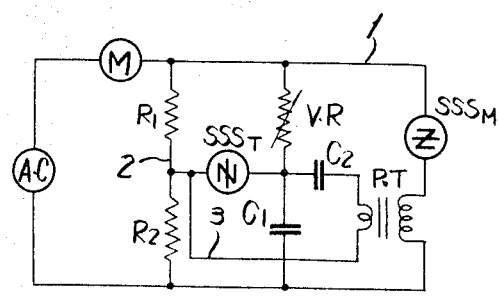

United States Patent

[11] 3,596,159

| | | |
|---|---|---|
| [72] | Inventor | Kenzi Kato<br>Tokyo, Japan |
| [21] | Appl. No. | 808,813 |
| [22] | Filed | Mar. 20, 1969 |
| [45] | Patented | July 27, 1971 |
| [73] | Assignee | Janome Swing Machine Co., Ltd.<br>Tokyo, Japan |
| [32] | Priority | Mar. 22, 1968 |
| [33] | | Japan |
| [31] | | 43/18190 |

[54] SPEED CONTROL CIRCUIT FOR A SINGLE-PHASE MOTOR, USING A THYRISTOR
5 Claims, 5 Drawing Figs.

[52] U.S. Cl.................................................. 318/227, 318/328
[51] Int. Cl.................................................. H02p 5/40

[50] Field of Search.................................. 318/310, 311, 326, 327, 328, 332, 345, 227

[56] References Cited
UNITED STATES PATENTS

| 3,461,370 | 8/1969 | Canter | 318/345 |
| 3,470,436 | 9/1969 | Steele | 318/227 |

*Primary Examiner*—Oris L. Rader
*Assistant Examiner*—Robert J. Hickey
*Attorney*—Linton & Linton ABSTRACT: The present motor speed control circuit uses a thyristor and a single phase of the ignition circuit is automatically changed in response to changes in the speed of the motor due to load changes thereby stabilizing the speed of the motor to a given speed.

INVENTOR.
KENZI KATO
BY
Sinton and Sinton
ATTORNEYS

INVENTOR.
KENZI KATO

SPEED CONTROL CIRCUIT FOR A SINGLE-PHASE MOTOR, USING A THYRISTOR

DESCRIPTION

The present invention is concerned with a motor speed control circuit using a thyristor. It is intended to obtain a motor speed control circuit in which a single phase of the ignition circuit is automatically changed in response to the change of revolution speed of the motor due to fluctuations in the load thereon, thereby stabilizing the speed of the motor to a set speed.

A motor speed control circuit using a thyristor has been known. However in a prior motor speed-control circuit using a thyristor, the speed of the single-phase motor connected to AC power source is controlled by changing a continuity angle of a symmetrical semiconductor switching element of a main circuit thyristor provided in a main circuit including said motor. For changing the continuity angle of the symmetrical semiconductor element of the main circuit thyristor, an ignition circuit is additionally provided comprising a phase-adjusting circuit and a pulse-generating circuit, in which the resistance value of a variable resistor in the phase-adjusting circuit is varied to change the single phase which is produced by the ignition symmetrical semiconductor switching element in the pulse generating circuit. However in this prior system, in case the motor is applied to a load with such torque characteristic changing from time to time as seen in a washing machine, the speed of the motor is considerably unstabilized and in effect an appropriate speed control is not achieved.

The present invention has been provided to eliminate the disadvantages of the prior art. The basic object of the present invention is to achieve a stabilized speed control of a motor which is connected to the ever changing load as above mentioned. To this end, the present invention automatically controls supply responsive to the load condition of the motor. Namely the speed variation of the motor is detected by a detector generator and fed back to an ignition circuit additionally provided to a main circuit thyristor. In this way the continuity angle of the main circuit thyristor is adjusted to compensate for the speed variation of the motor. Continuity angle of the main circuit thyristor changing in response to fluctuations of the load regulates the amount of electrical current flowing into the motor so as to keep the speed of the motor at a set speed. Thus a stabilized speed control can be achieved. Another object of the present invention is to realize the above appropriate and definite speed control. To this end, according to the present invention, forward direction characteristics of a silicon diode is utilized to prevent the fluctuation of the reference voltage due to the fluctuations of the load to obtain a substantially uniform reference voltage at all times. Next a difference voltage between said constant reference voltage and a control voltage varied in dependence upon the speed of the motor is utilized for making a steady and exact speed control of the motor.

Figure 2:
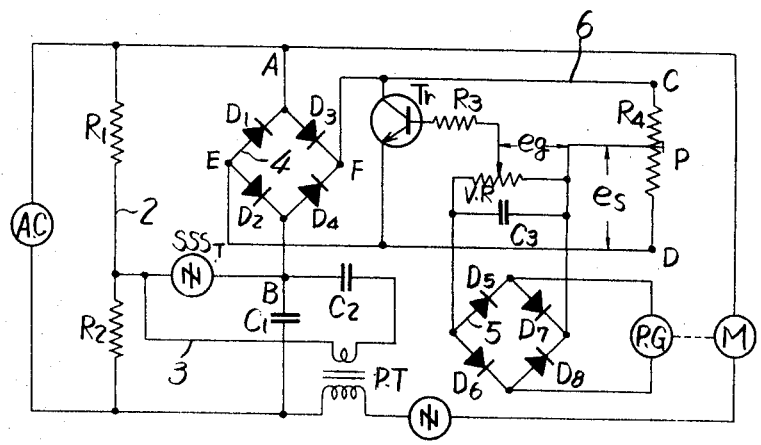
Figure 4:
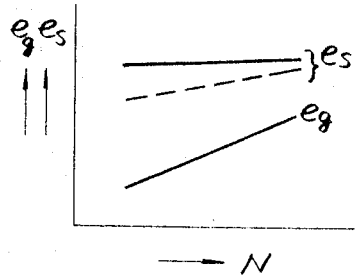
Figure 5:
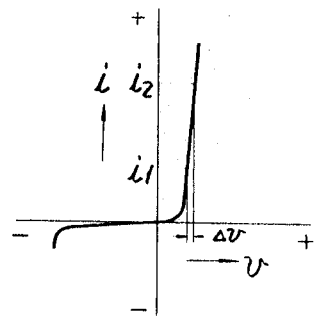
Figure 3:
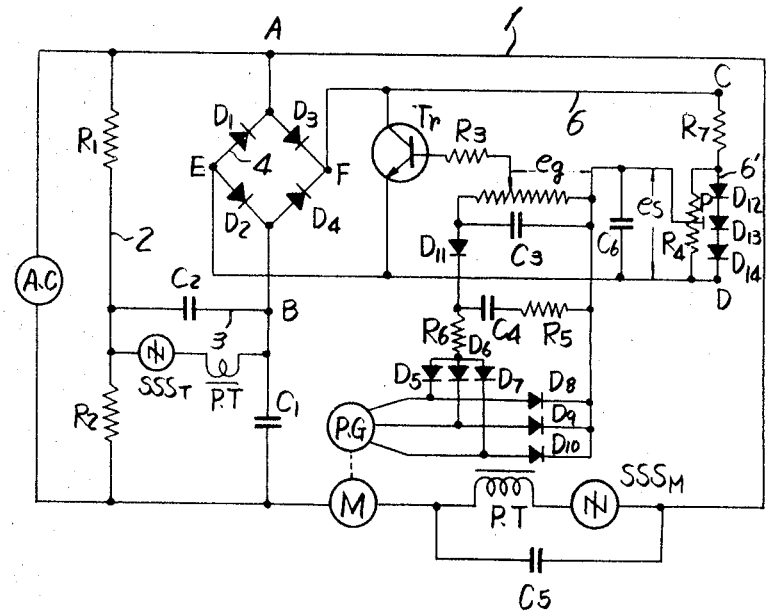

Other excellent characteristics and advantages of the present invention will be understood from the following description of the embodiments thereof with reference to the accompanying drawings, in which, FIG. 1 is a prior circuit using a thyristor for the speed control of a motor, FIG. 2 is a basic speed control circuit for a motor according to the present invention, FIG. 3 is a speed control circuit of a motor of the present invention which is an improvement over the circuit of FIG. 2, FIG. 4 is a diagram showing the relation between a reference voltage and a control voltage in the circuits of FIGS. 2 and 3, FIG. 5 is an explanatory view indicating the characteristics of a silicon diode as adopted in the circuit of FIG. 3.

With reference to the drawings, FIG. 1 shows a prior motor speed control circuit using a thyristor, in which a single-phase motor M is provided in the motor main circuit 1 connected to an AC power source. For the speed control of this motor M, said main circuit 1 is provided with a symmetrical semiconductor switching element $SSS_M$ of the main circuit thyristor and a secondary coil of the pulse transformer P.T. In parallel to the portion of the thyristor and pulse transformer secondary coil of this main circuit 1 there is provided a phase-adjusting circuit 2 consisting of resistors $R_1$, $R_2$, a variable resistor V,R, and a reactance element $C_1$ as illustrated. Further to this phase-adjusting circuit 2 there is connected a pulse-generating circuit 3 consisting of an ignition symmetrical semiconductor switch element $SSS_T$, a primary coil of pulse transformer P.T. and capacitor $C_2$ as illustrated. Thus an ignition circuit for thyristor $SSS_M$ is formed. Alternating current which flows into the motor M is controlled in accordance with the continuity angle of thyristor $SSS_M$ which is determined by a signal produced by switching element $SSS_T$ of the pulse-generating circuit 3. In short, continuity angle of said thyristor $SSS_M$ can be appropriately controlled by changing said signal phase at various angles with the variable resistor V,R. However with such a control circuit, in case of a load having a torque characteristic changing from time to time such as that of a washing machine, the fluctuation of the torque characteristic considerably disturbs the stabilized speed of the motor, and makes it impossible to accomplish a desirable speed control. For this reason the present invention provides a circuit as illustrated in FIG. 2 which is a basic embodiment of this invention and in which there are arranged substantially in the same manner as illustrated in FIG. 1, thyristor $SSS_M$, ignition switch element $SSS_T$, first and second resistors $R_1$, $R_2$, first and second condensers $C_1$, $C_2$, pulse transformer P.T. and respectively concerning the main circuit 1, phase-adjusting circuit 2 and pulse-generating circuit 3. Further in the circuit of FIG. 2, a first full-wave rectifier circuit 4 consisting of diodes $D_1$, $D_2$, $D_3$, $D_4$ are connected between terminal A of the main circuit 1 and terminal B of the pulse-generating circuit 4, a circuit 6, in which the terminals of the collector and emitter of transistor Tr and the terminals of a fourth resistor $R_4$ are connected in parallel, is provided between contacts E.F. on the DC side of said rectifier circuit 4, and further a variable resistor V.R. for speed setting, which is connected to the output terminal of generator P.G. for detecting the speed of the motor M, is provided between the base terminal of said transistor Tr and given point P of said resistor R. In parallel to this variable resistor V,R. there is connected a third condenser $C_3$ for smoothening the output voltage of detector generator P.G. and which condenser $C_3$ is also connected to the DC side of a second full-wave rectifier circuit 5 comprising diodes $D_5$, $D_6$, $D_7$, $D_8$, a third-phase resistor $R_3$ connected to the base terminal of transistor Tr for adjusting the feedback amount of the speed variation of motor M.

The above-mentioned circuit of the present invention automatically controls the current supply in response to the load condition of motor M. For example, when the load torque of motor M increases and the speed of the same is about to lower, the variation in speed, detected by the detector generator P.G. is fed back the ignition circuit. Thus the continuity angle of thyristor $SSS_M$ is augmented to compensate for the decrease in speed. To further explain this action, as apparent from the illustration, the continuity angle of the thyristor $SSS_M$ is controlled by changing the resistance value between A and B similarly to the case of FIG. 1. Namely phase-adjusting circuit 2 is constituted by a series circuit consisting of resistors $R_1$ and $R_2$ and a series circuit connecting resistance-adjusting circuit 6 to reactance element $C_1$ through full-wave rectifier circuit 4, both series circuits being respectively connected in parallel to the AC power source. The resistance-adjusting circuit 6 is adapted to change the reactance element $C_1$. With a change of resistance value at the resistance-adjusting circuit 6, the voltage vector of the series circuit including the resistance-adjusting circuit 6 and the reactance element $C_1$ is changed, and accordingly, the phase of voltage applied to ignition element $SSS_T$ is changed, which element $SSS_T$ being connected to between the juncture between the full-wave rectifier circuit 4 and the reactance element $C_1$ and the juncture between the resistors $R_1$ and $R_2$. Thus the ignition element $SSS_T$ breaks over to be conductive at a given phase, and the potential stored in condenser $C_2$ causes the thyristor $SSS_M$ to be conductive through the ignition element $SSS_T$, and the pulse transformer P.T. and accordingly with the increase of the resistance value continuity angle of thyristor $SSS_M$ is reduced, and with the decrease of the resistance value the continuity angle is increased. In the circuit of the present embodiment resistance value between these terminals A and B is changed by changing the resistance value between the emitter and the collector of transistor Tr. As is well known, the base current of this kind of transistor is inversely proportionate to the resistance value between the emitter and the collector so that by automatically changing this base current responsive to the fluctuations of the load, the continuity angle of thyristor $SSS_M$ can be automatically controlled. In the present circuit the base current is controlled by the differential voltage between the reference voltage $e_s$ which appears between one end of the fourth resistor $R_4$ and the point P and control voltage $e_g$ which varies in accordance with the speed of the motor and is applied to the variable resistor V.R. Therefore in the present circuit, the base current is automatically varied responsive to the fluctuation of load to change the continuity angle of the thyristor, thereby changing the amount of current flowing into motor M.

Thus the speed of motor M is maintained as a set speed at all times. As clearly seen from the circuit diagram of FIG. 2, the reduction of the resistance value of transistor Tr results in a drop of the reference voltage $e_s$. If reference voltage $e_s$ changes with the control voltage $e_g$ at the same ratio, no feedback action can be performed. However since reference voltage $e_s$ as shown in dotted line and the control voltage as shown in solid line in FIG. 4 are in relation to the revolution speed N of the motor, the feedback action is possible. In other words in case the load torque increases and the speed of the motor lowers when the motor is set at a given speed, control voltage $e_g$ reduces at a ratio higher than the ratio at which the reference voltage $e_s$ reduces so that a feedback action can be appropriately effected, because the reduction of voltage $e_s$ is caused by the fact that the resistance value between the emitter and the collector is reduced when he base current increases due to the reduction of voltage $e_g$. Appropriate selection of resistance value of said resistor $R_4$ connected in parallel between the emitter and the collector of transistor TR, will make it possible to adjust the inclination of reference voltage $e_s$ with respect to the revolution speed N of the motor in FIG. 4 and in effect to adjust the feedback amount. This resistor $R_4$ is also effective for setting voltage $e_s$ by limiting the voltage applied between the emitter and the collector of transistor Tr and by appropriately selecting point P.

The embodiment of this invention of FIG. 2, which is applied to a prior circuit in FIG. 1, can be also applied to an appropriate phase adjustment circuit. In this case, reactance element, condenser $C_1$ in FIG. 2, connected in series of the input terminal of the first full-wave rectifier circuit 4 consisting of diodes $D_1$—$D_4$ may be inductive.

A circuit as shown in FIG. 3 is a motor circuit of another embodiment of the present invention in which the basic circuit of FIG. 2 is further improved. As mentioned above, since internal resistance of transistor Tr is generally controlled by the differential voltage between the voltage $e_g$ which varies in dependence upon the speed of the motor and the reference voltage $e_s$, it is desirable that reference voltage $e_s$ is constant at all times, without being influenced by the load. However in the basic circuit of FIG. 2, the reduction of the resistance value between the emitter and the collector of transistor Tr effects a reduction of the voltage between terminals C and D which is dependent upon said resistance value. Thus reference voltage $e_s$ comes to show a characteristic as illustrated in a dotted line FIG. 4, all the more lowering the feedback performance. The embodiment of FIG. 3 improved this shortcoming. This circuit is so designed that the reference voltage $e_s$ varies little when he voltage between terminals C and D changes for this purpose between the terminals C and D of circuit 6 in FIG. 2, additional resistor $R_7$ and at least more than one silicon diode $D_{12}$ are connected with the former in series and the latter in parallel to the resistor $R_7$, a sixth capacitor $C_6$, which is mentioned hereinafter and said resistor $R_4$ constitutes a reference voltage generating circuit. In this manner, reference voltage $e_s$ is obtained by utilizing the forward voltage drop of said silicon diode $D_{12}$. As well known, the characteristics of the forward direction of the silicon diode is as shown in the first quadrant of the graph in FIG. 5 For example, when the forward current $i$ greatly changes from $i_2$ to $I_1$, the forward voltage drop little changes as shown by mark $\Delta v$. The circuit of FIG. 3 utilizes such a characteristic of the silicon diode. For example, often if the voltage between terminals C and D drops to cause a big change in the amount of electric current flowing to silicon diodes $D_{12}$—$D_{14}$, said characteristic keeps reference voltage $e_s$ substantially in a constant state. In the circuit of FIG. 3, although said diodes $D_{12}$ to $D_{14}$ substantially prevents the fluctuation of reference voltage $e_s$ due to the fluctuation of the load, a slight fluctuation of the reference voltages due to the aforementioned voltage drop $\Delta v$ as shown in FIG. 5 still exists. For eliminating the effect of this fluctuation to the reference voltages the present invention delays the time in which the fluctuation of $\Delta v$ is transmitted to reference voltage $e_s$ by providing the aforementioned capacitor $C_6$ as illustrated. Thus the slight fluctuation of voltage $e_s$ is prevented from effecting the speed control of the motor.

Further in the circuit of FIG. 3, although resistor $R_4$ is connected in parallel to diode $D_{12}$, and contact P for variable resistor V.R. is provided on said resistor $R_4$, the variable resistor V.R. may be connected directly between the aforementioned resistor $R_7$ and diode $D_{12}$. Further in the circuit of FIG. 3, diode $D_5$ to $D_{10}$ constitutes a circuit for full-wave rectifying the output of detector P.G. To the DC side of said rectifier circuit are connected a smoothening and compensating circuit consisting of diode $D_{11}$, resistor $R_6$, $R_5$, capacitors $C_3$ and $C_4$. Resistor $R_3$ connected to the base of transistor Tr serves for adjusting the amount of feedback while capacitor $C_5$ serves for preventing wave trouble.

As above stated, in accordance with the present invention, the phase of the ignition circuit is automatically changed in response to the fluctuation of the load, in effect to stabilize the revolution speed of a motor even if the load has any torque characteristics. Thus the speed control characteristic is much improved. Moreover, since the reference voltage is substantially kept constant independently of the fluctuation of the load, the feedback performance is much improved.

I claim:

1. A speed control circuit for a single phase motor using a thyristor comprising a main circuit including terminals for an alternating power source, terminals for said motor and said thyristor for ignition; an ignition circuit including a reactance element and ignition means connected to respond when the potential of said reactance element reaches a predetermined level; and means connected to said ignition means, which applies a switching pulse, upon response of said ignition means, to said thyristor to control the conduction thereof, said circuit for charging said reactance element including a full-wave rectifier circuit, the input terminal of which is connected in series to a charging path for said reactance element, a transistor having its emitter and collector connected across the output terminal of said full-wave rectifier circuit, a reference voltage circuit having its input terminal connected across said output terminal of said full-wave rectifier circuit and including resistor means, and means connected between the output terminal of said reference voltage circuit and the base of said transistor and detecting the motor speed to draw out a given feedback voltage, whereby adjustment of the motor-controlling voltage will be possible to change the current at the base of said transistor by means of a difference between said reference voltage and said feedback voltage.

2. A speed control circuit for a single-phase motor, using a thyristor as described in claim 1, including a symmetrical semiconductor switching element for the main circuit, a secondary winding of the pulse transformer and a motor connected in series, said main circuit being connected in parallel to said series circuit including said full-wave rectifying circuit and said reactance element.

3. A speed control circuit for a single-phase motor, using a thyristor as described in claim 1, including a series circuit of resistors connected in parallel to said series circuit including said full-wave rectifying circuit and said reactance element, a series circuit composed of a symmetrical semiconductor switching element for ignition, a primary winding of pulse transformer and capacitor, and connected between a juncture between said resistors and a juncture between said input terminal of said full-wave rectifying circuit and said reactance element.

4. A speed control circuit for a single phase motor, using a thyristor as described in claim 1 wherein said resistor of said reference voltage circuit has a given point, by which to take out a reference voltage.

5. A speed control circuit for a single-phase motor, using a thyristor as described in claim 1, including a resistor and a plurality of diodes connected in series between said terminals on the DC side of said full-wave rectifying circuit so as to utilize the forward voltage drop of said diodes as reference voltage.